2,778,828
METHOD FOR PRODUCING MELAMINE

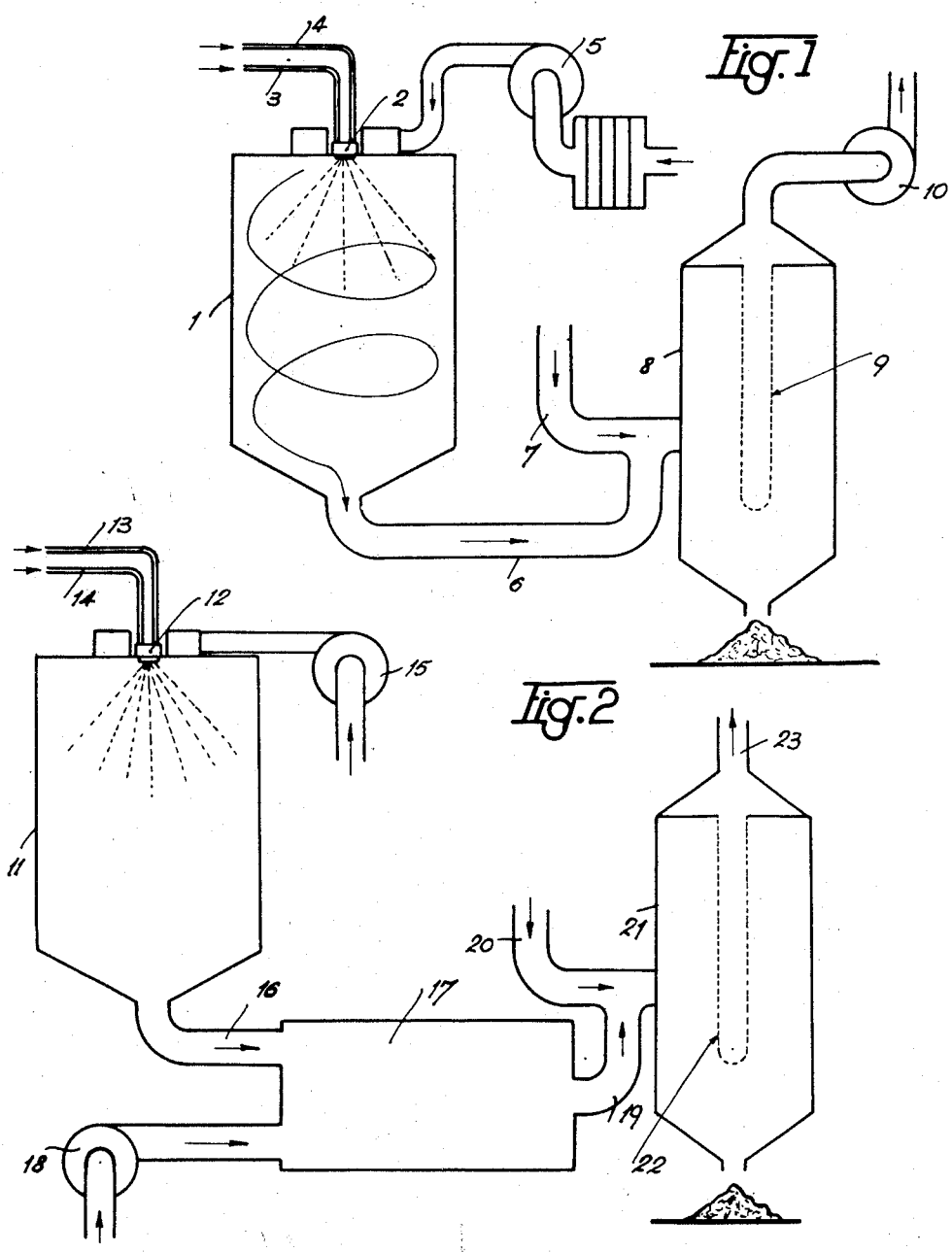

André Claude Vialaron, Lannemezan, France, assignor to Societe des Produits Azotes, Paris, France, a French company Application December 9, 1955, Serial No. 552,171

Claims priority, application France December 9, 1952

4 Claims. (Cl. 260—249.7)

My invention has for its object a method for the production on an industrial scale of melamine, starting from aqueous solutions of cyanamide and/or dicyandiamide.

A further object of my invention consists in the preparation of melamine which is thoroughly devoid of any condensation product such as melam or melem and the like and of substitution products such as ammeline or ammelide.

A further object of my invention consists in obtaining a high efficiency in the procedure of obtention of melamine adapted to be used in the formation of plastic material, chiefly in association with formaldehyde, said melamine being obtained starting from commercial calcium cyanamide.

The present application is a continuation-in-part of my co-pending application Serial Number 351,358 filed April 27, 1953.

It is known that it is possible to produce melamine through polymerisation of cyanamide or dicyandiamide. However this polymerisation obtained through the mere action of dry heat proceeds as an explosion by reason of the high exothermic character of the reaction. It is then practically impossible to stop the polymerisation when the melamine stage has been reached and there is formed a large amount of by-products of the type referred to hereinabove.

For this reason, it is generally necessary to resort to a dispersion or solution of the starting product in a mass of fluid devoid of water because the dilution in an inert medium provides for a slowing down of the reaction. In practice, only the polymerisation method executed under pressure in media having large contents of anhydrous ammonia leads to the obtention of a sufficiently pure melamine as the dissociation by ammonia of the by-products limits the contents of the latter in the final product.

In contradistinction, the dispersion of the cyanamide or dicyandiamide inside a liquid preferably at a temperature approximating the reaction temperature leads to a less pure product.

As to the polymerisation of a solution of cyanamide or dicyandiamide in solvents such as aniline, it is performed with an abundant formation of products of addition such as substituted melamines.

The method according to my invention allows removing these drawbacks. It consists chiefly in finely dispersing an aqueous solution of cyanamide and/or dicyandiamide in a reaction chamber heated to a temperature of 200 to 300° C, and maintained at atmospheric pressure.

I have found that in the presence of dry steam at a high temperature, ranging, as stated, between 200 and 300° C., the starting products and also the melamine formed are submitted to no substantial hydrolysis, in contradistinction with the conditions prevailing, when the same products are in the presence of liquid water or of saturating steam at similar temperatures.

Furthermore, steam acts through its thermic inertia corresponding to its comparatively high specific heat so that the polymerisation of a sufficiently fine dispersion of cyanamide and/or dicyandiamide in a gas medium laden with the latter substances produces melamine devoid of any condensation products, the polymerisation heat being readily removed as the reaction progresses.

The method according to my invention may be executed in a single reaction chamber inside which are introduced simultaneously, on one hand, a finely dispersed aqueous solution of cyanamide and/or dicyandiamide, and on the other hand, hot gases laden if required with steam, the heat carried by said hot gases being such that it heats the dispersion to be polymerised to the required temperature ranging, as stated, between 200 and 300° C. The reaction chamber being utilized at the atmospheric pressure, the reacting solution can be introduced through simple sprayers or atomizers, and the hot gases by means of fans.

It is of advantage to execute the treatment in two separate stages, to wit a dispersing and drying stage inside a first chamber into which is introduced in a continuous manner a finely dispersed aqueous solution of cyanamide and/or dicyandiamide together with heating gases adapted to keep the temperature in said chamber between 100 and 200° C. and a reaction stage inside a second chamber inside which are introduced continuously and simultaneously the dried dispersion from the first chamber and further heating gases adapted to raise the dispersion therein to a temperature ranging between 200 and 300° C.

In all cases, the concentration of the aqueous solution of cyanamide and/or dicyandiamide used may vary between extreme dilution and saturation and its temperature may range between 0 and 70° C., according to the concentration required.

It is for example of advantage to use as a starting material the cyanamide-containing lyes obtained by the reaction of carbon dioxide on aqueous solutions of calcium cyanamide, which lyes are produced on an industrial scale for the preparation of dicyandiamide. These lyes may be used either directly or else after transformation into dicyandiamidic lyes through alkaline polymerisation.

The dispersion of the aqueous solution of cyanamide and/or dicyandiamide may be obtained through any known means such as spraying or atomisation under pressure or otherwise.

An advantageous procedure for the execution of my invention consists in spraying liquid containing the polymerisable products inside compressed gases or air at room temperature. Such an auxiliary fluid keeps the nozzle atomizing the liquid at a comparatively low temperature which cuts out the possibility of any crystallisation and clogging as might occur as a sequence of an abnormal heating of said nozzle.

It is also possible to resort to the known method of direct atomization of the liquid under pressure, the atomizing nozzle being then advantageously cooled by water jacketing so as to keep said nozzle at a suitable temperature. In this case one can note that the utilization of the pressure on the liquid serves only to disperse it finely, as the introduction of the solution into the reaction chamber does not necessitate any appreciable pressure; this chamber, as mentioned above, is practically under atmospheric pressure.

However, any known atomizing method may be resorted to in the execution of my invention provided there is obtained a sufficiently fine dispersion into particles, the size of which is less than 100 microns, of the aqueous solution to be sprayed. No trace of melam or melem can be detected in this case in the melamine obtained in accordance with the method described.

The gases required for heating the single reaction chamber in the first modus operandi referred to hereinabove as also for the heating of two chambers, the dispersion or drying chamber and the reaction chamber, in the case of the second modus operandi, may be obtained through any known or suitable means.

It is also possible to provide an auxiliary heating of the chamber or chambers or again to associate several heating methods.

An advantageous manner of operating consists in sending into the chamber or chambers by means of an ordinary fan the gases produced by the total combustion of methane or the like combustible gases or liquids forming clean reaction products.

The hot gases entering the chamber or chambers may also draw a part of their heat from an exchange of temperature with the gases flowing out of the said chambers.

When the dispersion is treated inside a single reaction chamber, the heat applied by the heating gases should be sufficient for bringing the dispersion inside said chambers to a temperature of 200 to 300° C.

When operating in two separate stages, the amount of heat in the heating gases fed into the drying chamber should be sufficient for the dispersion to be raised to a temperature ranging between 100 and 200° C. In both cases, the mist formed by the solution is instantaneously vaporised and this cuts out any protracted contact between the reaction products and liquor water. On the other hand, it is transformed into a solid dispersion which is extremely fine.

The polymerisation of the solid particles thus separated from one another is performed in principle at a very high speed. However, if it is desired to obtain a high ratio of transformation of dicyandiamide into melamine, the following circumstances should be taken into account:

(i) the speed of polymerisation increases as a function of the temperature of the reaction chamber, whether said chamber is the single chamber in which the operation is entirely performed or a chamber following a separate dispersion and drying chamber; however, above 300° C., it is found that the product begins decomposing.

(ii) at a same temperature, the rate of polymerisation of dicyandiamide into melamine is substantially proportional to the time during which the product remains inside the reaction chamber.

Generally speaking, a lapse of time of about one minute inside the reaction chamber is suitable for obtaining a satisfactory rate of reaction.

The products escaping continuously out of the reaction chamber may be recovered through any known means adapted to collect a finely subdivided solid substance carried in a gas stream. It is sufficient to control this recovering procedure at a temperature higher than the dew temperature of the gas stream, with a view to cutting out any condensation of steam and consequently any contact between any liquid water and the hot reaction products. Furthermore, the reaction may be executed at a temperature at which the melamine formed is sublimated to a large extent and I may use in accordance with my invention any known or suitable method for collecting the vapors of the sublimated products. As the reaction is carried out under atmospheric pressure, all the classical dust-exhausters may be utilized, without modifications, in order to collect these vapors.

When the temperature and/or the duration of the reaction are insufficient for the complete transformation of the starting products into melamine while the product obtained as a result of the reaction still contains a more or less considerable proportion of dicyandiamide, I resort to any known or suitable means for separating said dicyandiamide such as a dissolution in water and fractional cristallization.

It is then of advantage to finish the reaction by washing the melamine at raised temperature and recycling the solution containing the non-polymerised dicyandiamide.

I have illustrated diagrammatically in accompanying drawings, by way of example and by no means in a limiting sense, two types of apparatus applicable to the execution of the method according to my invention.

In the example illustrated in Fig. 1, the apparatus includes a single reaction chamber 1 constituted by a heat-insulated cylinder having a vertical axis the diameter of which is say 1.50 meters and the height of which is say 2.50 meters, and which is of a light construction, as it is not submitted to any appreciable pressure. The cyanamidic solution to be polymerized is introduced into the upper part of said chamber and sprayed through an atomizing nozzle 2 by means of compressed air under a pressure of say 700 gr. per sq. cm. At 3 is shown the pipe feeding the solution to said nozzle and at 4, the pipe feeding the compressed air.

The heating gases fed for instance by a burner burning natural gas, are also introduced into the upper part of the chamber 1 by a fan or blower 5 which simply secures a light pressure in order to further the dispersion and the close contact between the hot gases and the sprayed liquid.

The products of reaction flowing out of the lower end of the chamber 1 are collected in a pipe 6 opening into a further pipe 7 fed with cooling air adapted to reduce the temperature of the products obtained down to about 100° C. and these products are then directed into a battery of cyclones such as 8 including sleeve filters as shown at 9, the remaining gases being returned into the atmosphere by the fan 10. The melamine formed is collected underneath the cyclones.

In the embodiment illustrated in Fig. 2, the apparatus is intended for executing the method according to the invention in two separate stages. It includes an atomizing and drying chamber 11 constituted by a heat-insulated cylinder having a vertical axis and the size of which may be for instance that given for the chamber 1 in the precedingly described example, to wit: 1.50 meter in diameter and 2.50 meters in height. The solution to be polymerized is introduced and sprayed as precedingly into the upper end of the chamber by means of an atomizing nozzle 12 fed with compressed air, at a pressure of say 700 gr. per sq. cm., said nozzle being fed with the solution through the pipe 13 and with compressed air through the pipe 14.

The heating gases that are to provide for the drying of the solution are produced for instance by a burner fed with natural gas and are sent into the chamber 11, more precisely, into the same part of the chamber as the sprayed solution, through a fan 15 in a manner such as will further the dispersion of the solution.

The dried product flowing out of the lower part of the chamber 1 collects inside a pipe 16 and is sent into the reaction chamber 17 constituted by a heat-insulated cylinder having a horizontal axis, the diameter of said cylinder being for instance equal to 2 meters and its length being equal for instance to 3 meters. The heating gases that ensure the polymerization are introduced also in the present case in the same end of the chamber 17 as the dried product through the agency of a fan 18 in a manner such that they may have a favorable action on the speedy uniformization of temperature.

The reaction products are lastly collected in a pipe 19 opening into a further pipe 20 feeding cooling air, wherethrough the mixture is finally fed into a battery of cyclones such as 21 carrying each a sleeve filter such as 28, the remaining gases being exhausted through the filter into the atmosphere at 23.

Starting from various raw materials and operating at different hourly speeds and at different temperatures, I have obtained mixtures having the compositions disclosed in the following tabulae:

| Solution Treated | Gr. per liter | Hourly Output in liters | Temperature of product in reaction chamber, degrees | Duration of reaction, seconds | Products Obtained | | Yield [1] |
|---|---|---|---|---|---|---|---|
| | | | | | Melamine, percent | Dicyandiamide, percent | |
| Dicyandiamide | 100 | 30 | 230 | 10 | 21 | 78.9 | 99.9 |
| | — | 40 | 245 | 16 | 32 | 68 | 99.9 |
| Cyanamide | 80 | 35 | 240 | 25 | 40.1 | 59.9 | 99.9 |
| Dicyandiamide | 100 | 25 | 275 | 50 | 75.4 | 24.5 | 99.9 |
| | 200 | 50 | 285 | 120 | 96 | 4 | 99.9 |
| Cyanamidic lye | 120 | 60 | 280 | 180 | 98 | 1.9 | 99.9 |

[1] Definition of the yield: $Y = \dfrac{\text{Percentage of melamine obtained}}{\text{Percentage of melamine calculated with reference to the dicyandiamide disappeared}} \times 100$ All these mixtures are entirely soluble in water and formaldehyde.

What I claim is:

1. A method for producing melamine devoid of any substantial amount of by-products, consisting in forming an aqueous solution of a cyan derivative of ammonia of the formula $(CN_2H_2)X$, wherein X means a whole number not greater than 2 and which solution contains 50% to 80% water, creating a fine dispersion of said solution in a confined area maintained at substantially atmospheric pressure, heating said dispersion while so confined to a temperature ranging between about 200 and 300° C. and collecting the resulting pure melamine.

2. A method for producing melamine devoid of any substantial amount of by-products, consisting in introducing continuously into a confined area maintained at substantially atmospheric pressure, a finely dispersed aqueous solution of a cyan derivative of ammonia of the formula $(CN_2H_2)X$ wherein X means a whole number not greater than 2, and simultaneously introducing into the same area a continuous stream of combustion products from burning gases, at a temperature such as will raise the temperature of said dispersion to between about 200 to 300° C. and collecting the pure melamine so formed.

3. A method for producing melamine devoid of any substantial amount of by-products, consisting in introducing continuously into a confined area having substantially an atmospheric pressure, a finely dispersed aqueous solution of a cyan derivative of ammonia of the formula $(CN_2H_2)X$ wherein X means a whole number not greater than 2, simultaneously introducing into the same area a continuous stream of dry steam-laden heating gases, at a temperature such as will raise the temperature of the dispersion to between about 200 and 300° C. and collecting the pure melamine formed.

4. A method for producing melamine devoid of any substantial amount of by-products, consisting in introducing continuously inside a first confined area having substantially an atmospheric pressure, a finely dispersed aqueous cyan derivative of ammonia of the formula $(CN_2H_2)X$ wherein X means a whole number not greater than 2, introducing into the same area a continuous stream of hot drying gases adapted to keep the temperature inside said chamber at a value ranging between about 100 and 200° C. and introducing then simultaneously and continuously into a second area of confinement on one hand the dispersion dried in said first area and, on the other hand, hot gases adapted to raise the temperature of said dispersion to a value ranging between about 200 and 300° C. and collecting the melamine so formed.

No references cited.